US006553347B1

(12) United States Patent
Tavor et al.

(10) Patent No.: US 6,553,347 B1
(45) Date of Patent: Apr. 22, 2003

(54) AUTOMATIC VIRTUAL NEGOTIATIONS

(75) Inventors: Onn Tavor, Ramat Hasharon (IL); Gila Ben Avrahan, Netania (IL); Vadim Shevchenko, Netania (IL)

(73) Assignee: Active Point Ltd., Natanya (IL)

( * ) Notice: Subject to any disclaimer, the term of this patent is extended or adjusted under 35 U.S.C. 154(b) by 0 days.

(21) Appl. No.: 09/317,956

(22) Filed: May 25, 1999

Related U.S. Application Data

(63) Continuation-in-part of application No. 09/236,098, filed on Jan. 25, 1999.

(51) Int. Cl.[7] .......................... G06F 17/60; G06F 15/00
(52) U.S. Cl. ............................... 705/14; 705/1; 705/26; 705/27; 705/37; 705/80; 707/3; 707/4; 707/5
(58) Field of Search ............................. 705/14, 26, 27, 705/80, 37, 1; 707/3, 4, 5

(56) References Cited

U.S. PATENT DOCUMENTS

| | | | | |
|---|---|---|---|---|
| 5,933,822 A | * | 8/1999 | Braden-Harder et al. | 707/5 |
| 5,974,399 A | * | 10/1999 | Giuliani et al. | 705/14 |
| 6,035,288 A | * | 3/2000 | Solomon | 705/37 |
| 6,055,513 A | * | 4/2000 | Katz et al. | 705/26 |
| 6,055,519 A | * | 4/2000 | Kennedy et al. | 705/80 |
| 6,085,178 A | * | 7/2000 | Bigus et al. | 705/80 |
| 6,141,653 A | * | 10/2000 | Conklin et al. | 705/80 |

FOREIGN PATENT DOCUMENTS

| | | | |
|---|---|---|---|
| EP | 968480 | * | 1/2000 |
| WO | WO 9843146 | * | 10/1998 |
| WO | WO 9847059 | * | 10/1998 |
| WO | WO 200043853 | * | 7/2000 |

OTHER PUBLICATIONS

Feldman et al., "Intelligent Agents: A Primer", Searcher, 7,9,42, Oct., 1999.*
Kiley, "The cyberspace databse information overload", Catalog Age, v12n9, pp: 56–58, Sep. 1, 1995.*

(List continued on next page.)

*Primary Examiner*—Vincent Millin
*Assistant Examiner*—Nga B. Nguyen
(74) *Attorney, Agent, or Firm*—Mark M. Friedman

(57) ABSTRACT

A method for conducting "one to one" commercial negotiations through an electronic medium such as the Internet. The negotiation process consists of sending persuasive texts to the user by the system, including discounts given by the system and responses to the price offers of the user. The system offers the product for a specific price, a price that may be optionally decreased as negotiation continues. The system frequently asks how much the user is willing to pay for the product. Based on the user's input, the system may accept the offer or, after one or more unacceptably low inputs from the user, may alternatively end the process of negotiation. Preferably, the system negotiates on many more parameters than simply the price itself. For example, the system may offer the user several presents or benefits in order to secure the sale. Commercial considerations are preferably included during this process. For example, the human merchant (vendor) receives a greater benefit by giving a small discount on the shipping cost than a large discount on the price of the product. The vendor preferably decides how to allocate control to the system. More preferably, the system features natural language capabilities which enable the user to interact as if with a human being, with a natural human language communication style. In addition, preferably the system stores information about users and the negotiation processes, so if the user interacts with the system again, then preferably the system can adjust the negotiation process more specifically for that user.

11 Claims, 7 Drawing Sheets

OTHER PUBLICATIONS

Hof et al, "Now it's your Web: The Net is moving toward one-to-one marketing", Business Week, Oct. 5, 1998, No. 3598, p. 164.*

Dragan, "Future agent software", PC Magazine, v16, n6, p190(2), Mar. 25, 1997.*

Baen, "The coming downsizing of ral estate: Implications of technology", Journal of Real Estate Porfolio Management, v3n1, PP: 1–18, 1997.*

Frank, "Future database technologies now", DBMS, v8, n12, p52(5), Nov. 1995.*

* cited by examiner

AUTOMATIC VIRTUAL NEGOTIATIONS

This is a Continuation-in-Part Application of U.S. patent application Ser. No. 09/236,098, filed on Jan. 25, 1999, which is currently pending.

FIELD AND BACKGROUND OF THE INVENTION

The present invention relates to commercial negotiations on the Internet, and in particular, to a method for providing automatic negotiation procedures for purchasing goods and services, including offering price discounts and presents, and other inducements through an electronic interface, without requiring human intervention. The negotiation process is started and conducted using personal criteria and behavior of each customer separately, such that the negotiations do not involve an auction. According to preferred embodiments of the present invention, the negotiation process features natural language capabilities in order to impart the feeling of negotiating with a human being.

As the Internet grows, many Web sites are becoming connected and more corporations are trying to do business on the "Web". Although most information is still given freely on the Internet, an increasing number of organizations are attempting to actually sell their products electronically by charging a credit card. The area of electronic sales, or Electronic Commerce (e-commerce), has been developing rapidly. E-commerce provides anyone, located almost anywhere in the world to which a Web connection is available, to access any commercial business offerings through a catalog implemented as a Web site. Moreover, the use can access this service anytime, 24 hours a day, seven days a week. However, automatic negotiation procedures are currently not available, such that the user cannot interact with the e-commerce vendor in a manner similar to interaction is available with a human merchant.

Some potential customers may actually prefer to spend more time traveling to various human merchants in order to find a "bargain" through negotiations. The process of negotiation itself adds a "spark" to the process of shopping. The psychological effect of such a process from the user's point of view is enormous, regardless of the actual amount of discount received. The whole process of shopping through an electronic interface such as the Internet suddenly becomes more exciting, and the user feels like a special, important customer in a "real" shop.

There is thus a need for, and it would be useful to have, a method for conducting negotiations on commercial sites through an electronic interface such as the Internet or through some other electronic connection.

SUMMARY OF THE INVENTION

It is one object of the present invention to provide a system to conduct "one to one" negotiations.

It is another object of the present invention to provide intelligent interactions with a computer user for the purpose of securing a sale.

It is yet another object of the present invention to provide such intelligent interactions through a GUI (graphical user interface).

It is still another object of the present invention to provide such a GUI through a Web browser, such that the virtual sales representative is accessed through the Internet. Alternatively, the GUI is provided through an applet or other static software program, such that the virtual sales representative is accessed through a locally operated software module.

It is still another object of the present invention to provide naturalistic communication with the user through the GUI, such that the user is able to interact with the virtual sales representative through natural language-based communication.

These and other objects of the present invention will be explained in further detail with regard to the description, figures and claims given below.

The present invention is of a method for conducting "one to one" commercial negotiations through an electronic medium such as the Internet. The negotiation process consists of sending persuasive texts to the user by the system, including discounts given by the system and responses to the price offers of the user. The system offers the product for a specific price, a price that may be optionally decreased as negotiation continues. The system frequently asks how much the user is willing to pay for the product. Based on the user's input, the system may accept the offer or, after one or more unacceptably low inputs from the user, may alternatively end the process of negotiation.

Preferably, the system negotiates on many more parameters than simply the price itself. For example, the system may offer the user several presents or benefits in order to secure the sale. Commercial considerations are preferably included during this process. For example, the human merchant (vendor) may receive a greater benefit by giving a small discount on the shipping cost than a large discount on the price of the product. The vendor preferably decides how to allocate control to the system.

According to the present invention, there is provided a method for an automatic negotiation process with a user through an electronic interface for a product having a starting price and a price offer from the user, the steps of the method being performed by a data processor, the method comprising the steps of: (a) comparing the price offer to the starting price according to a negotiation comparator; (b) if the negotiation comparator is fulfilled by the price offer, accepting the price offer of the user; and (c) alternatively, if the negotiation comparator is not fulfilled by the price offer, offering a discount incentive to the user.

According to another embodiment of the present invention, there is provided a method for interacting with a user about a product, the method comprising the steps of: (a) providing a plurality of keywords, each of the plurality of keywords indicating a topic; (b) receiving a natural language query from the user, the query including at least one word; (c) parsing the query into the at least one word; (d) determining a reaction of the user to the product according to the at least one word; (e) examining a library of comments for a comment to construct a reply to the user; (f) if the comment is not found, comparing the at least one word to the plurality of keywords; and (g) if the at least one word matches one of the plurality of keywords, selecting the reply according to the topic.

Hereinafter, the term "discount incentive" refers to an incentive for a user to purchase a product, including but not limited to, a discount in the price of the product, a present (such as an additional product at a low cost or at no additional cost), a benefit (such as a "buyers club" card) and a discount in the price of shipping the product.

Hereinafter, the term "electronic interface" refers to any interface which does not involve a direct human interaction, including but not limited to, the Internet.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtually reality modeling language), dynamic HTML, XML (extended mark-up language) or related computer languages thereof, as well as to any collection of such documents reachable through one specific Internet address or at a specific World Wide Web site, or any document obtainable through a particular URL (Universal Resource Locator). Hereinafter, the term "Web site" refers to at least one Web page, and preferably a plurality of Web pages, virtually connected to form a coherent group.

Hereinafter, the term "applet" refers to a self-contained software module written in an applet language such as Java or constructed as an ActiveX™ control. Hereinafter, the term "network" refers to a connection between any two computers which permits the transmission of data.

Hereinafter, the term "computer" includes, but is not limited to, personal computers (PC) having an operating system such as DOS, Windows™; OS/2™ of Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows™" includes but is not limited to Windows95™, Windows 3.x™ in which "x" is an integer such as "1," Windows NT™, Windows98™, Windows CE™ and any upgraded versions of these operating systems by Microsoft Inc. (Redmond, Wash., USA).

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "user" is the person who operates the Web browser or the GUI interface and navigates through the system of the present invention.

Hereinafter the word "product" includes both physical products and services (tangible and intangible products), as well as ideas and concepts.

The methods of the present invention can be described as a series of steps performed by a data processor, such that the method can be implemented as software, hardware, firmware or a combination thereof. As software, the method of the present invention can be implemented in any suitable programming language which is compatible with the computer operating the software acid and which could be selected by one of ordinary skill in the art. Examples of such languages include, but are not limited to, C and C++.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE INVENTION

The present invention is of a method for conducting "one to one" commercial negotiations through an electronic medium such as the Internet. The negotiation process features one or more exchanges between the user and the system, including discounts given by the system and responses to the price offers of the user. The system offers the product for a specific price, a price that may be optionally decreased as negotiation continues. The system frequently asks how much the user is willing to pay for the product. Based on the user's input, the system may accept the offer or, after one or more unacceptable low inputs from the user, may alternatively end the process of negotiation. Preferably, the system negotiates on many more parameters than simply the price itself. For example, the system may offer the user several presents or benefits in order to secure the sale. Commercial considerations are preferably included during this process. For example, the human merchant (vendor) may receive a greater benefit by giving a small discount on the shipping coat than a large discount on the price of the product. The vendor preferably decides how to allocate control to the system.

The process of negotiation preferably is performed by comparing a price offer from the user to a starting price by a negotiation comparator, such as a neural network for example. If the price offer is allowed by the negotiation comparator, as described in greater detail below, then the process ends. Otherwise, a discount incentive is offered to the user.

The principles and operation of a method for providing an automatic negotiation process to a computer user according to the present invention may be better understood with reference to the drawings and the accompanying description, it being understood that these drawings are given for illustrative purposes only and are not meant to be limiting.

Figure 1:
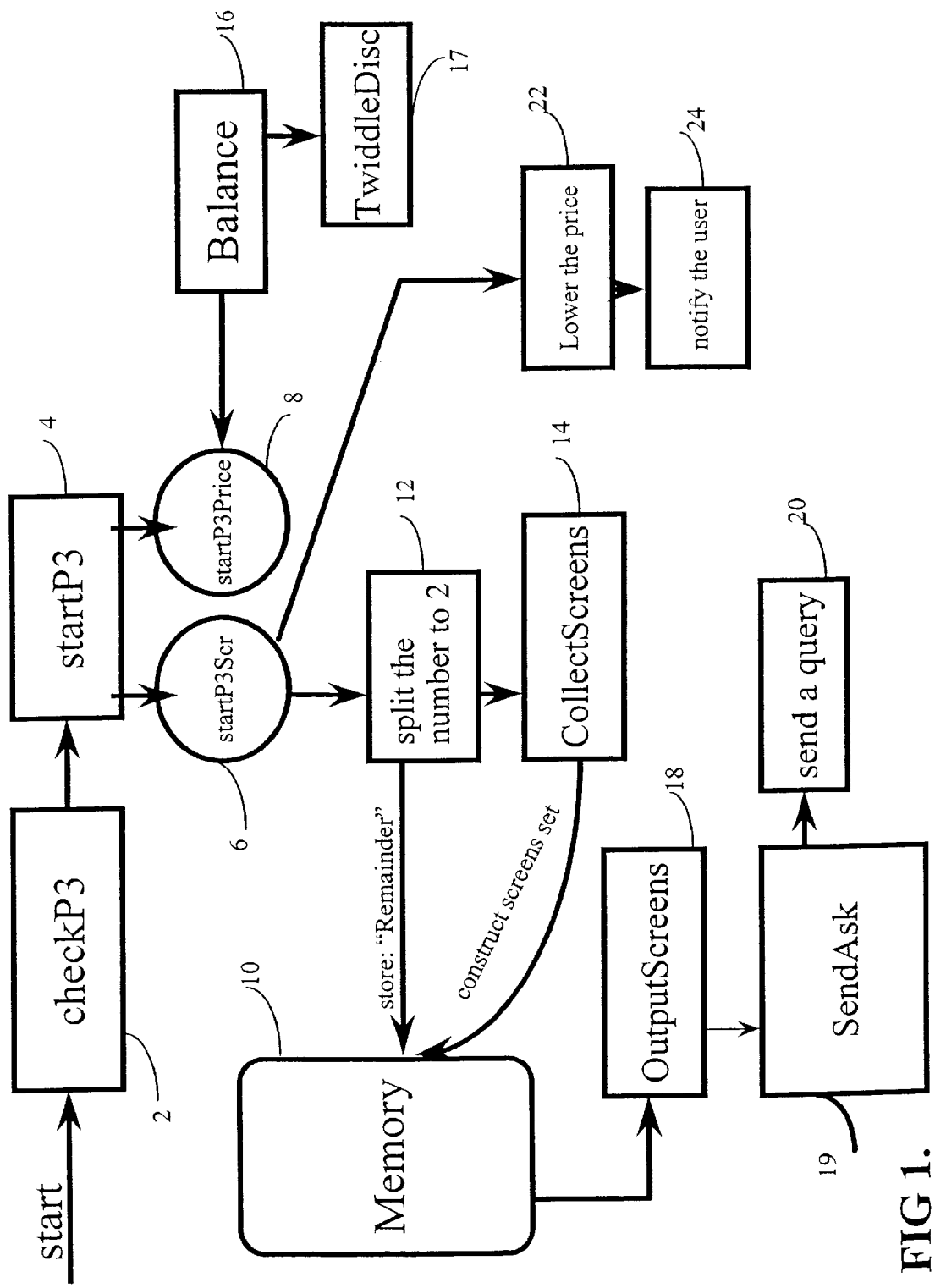
FIG. 1 is a schematic block diagram of an illustrative method for starting the process of negotiations using a Neural Network implementation according to the present invention.
Figure 2:
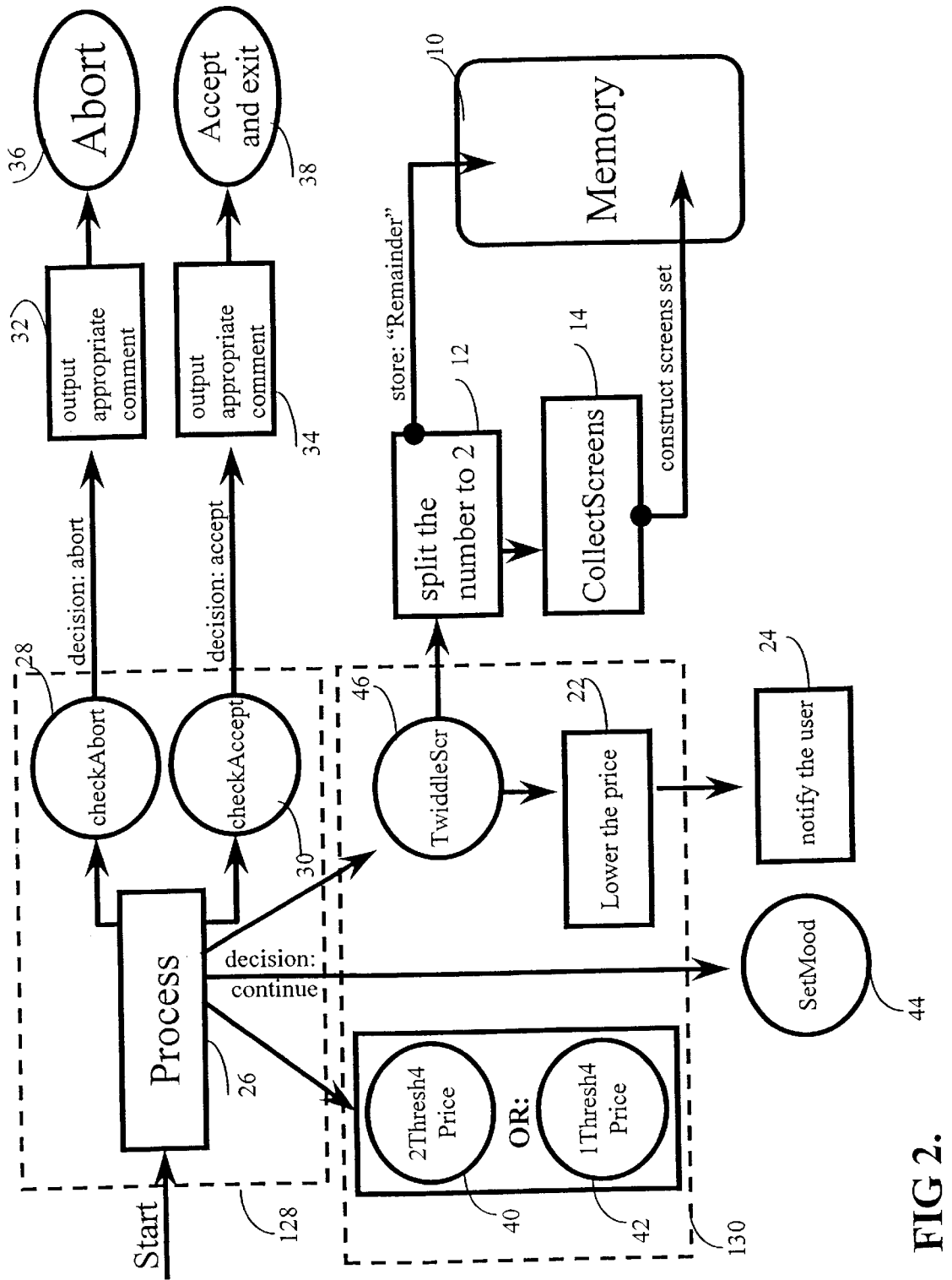
FIG. 2 is a schematic block diagram of an illustrative method for processing input from the user through a Neural Network implementation according to the present invention.

Referring now to the drawings, FIG. 1 is a schematic block diagram of an illustrative method for starting the process of negotiations using a Neural Network implementation according to the present invention. FIG. 2 is a schematic block diagram of an illustrative method for processing input from the user through a Neural Network implementation according to the present invention. The following description is to be understood with reference to both FIG. 1 and FIG. 2.

According to the present invention, preferably a plurality of neural networks is implemented for various purposes, including the step of determining the length of negotiation, preferably according to the number of separate interactions through the GUI of the user. In this case, a neural network is used for the negotiation comparator and for the discount incentive comparator, as described in greater detail below. The discount incentive comparator determines when a discount incentive may be offered to the user. Additionally, the step of determining the next discount and the step of determining the "mood" of the system are also performed with neural networks. The number of the rental networks can vary, such that the number is substantially unlimited.

Optionally and preferably, the number of different inputs from the responses of the user can vary. These neural networks are incorporated into a system for performing negotiations which is invoked during the sales process in an attempt to complete the sale of the product. The system includes a number of modules, described in greater detail below, for receiving input from the user, analyzing the input according to the neural networks and then sending an output to the user. The process of negotiation preferably continues until some predefined endpoint is reached, such as the sale of the product or receiving an unacceptable offer from the user, for example. More preferably, a neural network is used to mark the endpoint, rather than predefining the endpoint.

The process begins when a CheckP3 routine module 2 is launched. This routine checks to see if all conditions to begin negotiations are fulfilled. The conditions preferably include the following. First, preferably the user has received information for purchasing one or more products. Second, the products have an associated price. Third, the product has not been purchased. Fourth, preferably the vendor has determined that the price of the product is negotiable.

If all of these conditions are fulfilled, CheckP3 routine module 2 sends a query to the user in order to determine if the price of the product is a barrier to completion of the sale. If the user responds affirmatively, CheckP3 routine module 2 starts two modules for operating the neutral networks, StartP3Scr routine module 6 and StartP3Price routine module 8.

Preferably, initially two such neutral networks are employed, a first network to determine the length of negotiations to be performed before the first discount is given StartP3Scr routine module 6 and the second network to determine the initial discount StartP3Price routine module 8. The phrase "length of negotiations" refers to a measurable portion of the negotiating procedure which is performed. Preferably, this portion is determined according to the number of different GUI displays, or "screens", which are displayed to the computer user. Alternatively and preferably, this portion is determined according to an elapsed period of time.

In addition, preferably CheckP3 routine module 2 also sets the initial mood to "medium". Subsequently, the mood is based on at least two price offers received from the user and the trend detectable from these prices. The trend is preferably selected from one of three predefined states: constant, when these two or more prices are the same; rising, when the price is larger than the previously received price; and falling, when the price is smaller than the previously received price. Clearly, as the user increases the price offer to match that being offered by the vendor, the trend is rising and therefore the mood is favorable. Alternatively, if the price offer is lowered by the user, then the trend is falling and the mood is not favorable.

CheckP3 routine module 2 preferably also raises the status flag "push3". Upon detection of this flag, the main routine module, a StartP3 routine module 4, is started by the system. StartP3 routine module 4 performs several functions. First, StartP3 routine module 4 addresses the memory to output comments from the system, if any. If no comments are to be output to the user, StartP3 routine module 4 receives a query from the external library and prompts the user to input a price offer for the product. After the user enters such an answer, StartP3 routine module 4 calls a Process routine module 26 to examine the input of the user. Once the user agrees to purchase the product, the system ceases to function and passes control of interactions with the user to a purchasing software module (not shown), to complete the formalities of the purchase as is well known in the art.

Once the neural network is StartP3Scr routine module 6 returns a numerical answer, considering the length of negotiations until the first discount is given, this number is compared to a predetermined constant. For example, if the constant is 2 and the network's result is large than 2, the result is preferably divided into 2 parts, as shown in Block 12 of FIG. 1. A first part represents the number of comments sent by the system to the user until the system sends the first query to the user, and the second part represents the number of comments with the user after the query has been sent. The division is preferably performed by randomly selecting a number between 1 and the result from the network, such that this number becomes the number of interactions performed after the query has been sent. This number is preferably stored in a member 10 as the "Remainder" for future use.

If the result from the network is smaller than, or equal to, the predetermined constant, a discount on the price of the product is given immediately, as shown in FIG. 1, Blocks 22 and 24. The discount is calculated according to the result of StartP3Price routine module 8, without receiving any input from the user. In this case the "Remainder" value is set to 0.

After the first price offer is received from the user, preferably a store routine module (not shown) determines whether overcharging may have occurred, such that the user entered a price offer which is larger than the original price set by the vendor. If such overcharging occurs, an appropriate message is sent to the user and the input is deleted from the system. If such overcharging did not occur, the input is appended to a list which holds every input received by the user since the beginning of the negotiating process.

Next, the neural network contained in an One Thresh4Price routine module 42 overrides the neural network in StartP3Price routine module 8 to set the discount. Another neural network, contained within a CheckAccept routine module 30 takes part in the process, to determine if the price offer of the user is acceptable by using the neural network.

The "Remainder" value is then examined. If this number is larger than a predetermined constant, such as 2, then this number is preferably divided into 2 parts, as shown in Block 12 of FIG. 1, as for the result of StartP3Scr routine module 6. A new "Remainder" value is then calculated and stored in the memory 10, replacing the existing "Remainder" value. If the existing "Remainder" value is smaller than, or equal to, the predetermined constant, a discount is preferably given immediately 22, the user is notified of the discount 24 and the new "Remainder" value is preferably set to 0.

After the second price offer is received from the user, the second offer is examined either by CheckAccept routine module 30, to determine whether to accept the offer 38, or by a CheckAbort routine module 28, which contains a neural network to determine whether to end the negotiation process 36. Both modules as described in greater detail with regard to FIG. 2 below.

If the price offer is neither accepted nor the negotiation process is ended, the negotiation process continues. A TwiddleScr routine module 46, containing a neural network, then receives at least the previous two offers made by the user in order to determine the number of interactions to be performed before the next discount is given. The discount itself is determined by a TwoThreshes4Price routine module 40.

Preferably, a Balance routine module 16 provides overall control for the amount of the discount to the price offer for the user. Balance routine module 16 receives the result from the networks which control the discount (either TwoThreshes4Price or One Thresh4Price). Each of these networks returns a real number which states the amount of the next discount the user is to receive, given as percents of the original price of the product, the current discount, stored in memory 10, and the maximum discount allowed which is preferably predetermined by the vendor. If the current discount plus the result of the network is smaller than the maximum allowed discount minus 1, Balance routine module 16 invokes a TwiddleDisc routine module 17 which will add or subtract X percents, 0<=X <=1 to the network's results. This is done to avoid situations when each time the user gets into the system he gets the same discounts.

TwiddleDisc routine module 17 uses a pseudorandom number generator to render a signed real R, −1<=R<=1, as the sign number. TwiddleDisc routine module 17 launches a pseudorandom number generator with the seed number, preferably "2", to return the sign. Preferably, if the result of the pseudorandom generator is "1", then the sign is positive. Alternatively, if the sign number is "2", then sign is negative. TwiddleDisc routine module 17 then launches the pseudorandom number generator again with a different seed number, preferably 100, to obtain a second result. The second result is then divided by 100, and the sign of the resultant percentage is determined by the sign obtained previously.

Alternatively, if the discount which has already been given to the user, plus the network result, is greater than the maximum discount allowed, Balance routine module 16 overrides the network result by setting the current discount amount to the difference of the maximum discount and the discount which has already been offered by the user. This is the last discount that the user receives in the current session. Also alternatively, if the neural network result is greater than the maximum discount allowed minus 1, and smaller than the maximum discount, the result remains unchanged.

In addition, with regard to FIG. 2, the neural network contained in a SetMood routine module 44 is launched to set the system's mood according to at least the two previous price offers by the user. SetMood routine module 44 also considers the previous mood to determine if the existing mood is more or less favorable, according to the behavior of the user.

The neural networks of the present invention are preferably implemented as follows. For the purpose of testing only and as a preferred implementation, all of the neural networks were forward propagation networks, although other method are possible. These networks were then trained on imaginary data and collected negotiation cases. The inputs and outputs of each neural network were numerical, although other input types such as symbolical are possible. The neuron function used in every neural network was a sigmoid, although again, other functions are possible.

Each neural network employed certain global parameters such as the sales rate for the product, represented by a numeric constant according to the amount of the sales, the lower price limit, given as a percentage of the original price, and so forth. At the very least, this global parameter included the price of the product. Other optional global parameters include, but are not limited to, a constant limiting the number of different interactions with the user before the process is ended and a constant which defines the "unreasonable limit" below which a price offer causes the negotiation process to be ended by the system.

Each neural network was implemented as a separate encoded file. The interaction with these file(s) was done through a call to an external function which was an interpreter of the neural network code, although other implementations are possible.

The "StartP3Scr" neural network used the global parameters as well as parameters such as: whether a negotiation process took place in the current session and whether the user is a member of the merchant's loyalty club. The network was trained on 100 cases where the data was distributed evenly to deal with a fair percent of all cases and combinations possible. The network's output was a real number which represented the number of screens until the first discount is given, such that the number was rounded.

The "StartP3Bid" network used the same parameters as "StartP3Scr" does, plus the result received from "StartP3Scr" (rounded). The network was trained on 150 cases where the data was given in such a manner that the biggest weight was set on the neurons which represent the result received from the "StartP3Scr" routine and the sales rate for the product. The output was a real number which stated the first discount to be given to the user. It should be noted that "StartP3Bid"'s result is used only if the "StartP3Scr" routine returns a number which is less or equal to two. After the first price offer given by the user, the result of the "StartP3Bid" routine is overridden by the network "OneThresh4Price".

The "SetMood" network used the global parameters plus the previous mood and the last two user inputs. The network was trained on 126 cases. The data was distributed unevenly—special attention was given to cases where the user enters values that are very close to each other, and to cases where the inputs are unreasonably far away from each other, for example 0 and 1000. The user values were given the largest weight. The network produced a real number in a range of 0 to 4 which was rounded and treated as the system's "mood".

Both of the networks "OneThresh4Price" and "TwoThreshes4Price" used the global parameters plus the user inputs. "OneThresh4Price" used the last user input while "TwoThreshes4Price" used the last two user inputs. Both of the networks were trained on 289 cases. The data was distributed unevenly—special attention was given to cases where the input(s) was very close to the price offered by the system. When designing the neural network the biggest weight was set on the user input(s).

The output produced by both networks was a real number representing the next discount the use is to receive, given as percents of the original price.

The network "SetScreens" used the system's mood, the user inputs and the result returned from either "OneThresh4Price" or "TwoThresh4Price". The network was trained on 120 cases where the data was distributed evenly. The most important inputs were the mood and the user inputs. The output of the network was rounded and used as the amount of screens that are output until the next discount was given.

The networks "CheckAbort" and "CheckAccept" used the mood and the user inputs as well as the global parameters. Each of the networks was trained on 200 cases. "CheckAccept" was launched only when the current user's input was greater than the current price minus the discount to be given, thus the data used for training this network consisted of cases where the input was close enough to the current price offered by the system. The current offer as well as the user inputs were given as percents of the original price. Most of the weight of the network's input concentrated on the response of the user.

As an optional but preferred embodiment of the present invention, additional interactions with the user are performed beyond requests for, and receipt of, new price offers from the user. These additional interactions preferably are in the form of comments to the user. For example, the comment could be a product recommendation; a warning that the negotiation process will end soon; reactions to the offer of the user, particular if a later offer is less than a previous offer; general comments according to the "mood" of the system in order to prolong a favorable trend or reverse a non-favorable trend; and start comments, where are special for the beginning of the negotiation.

All comments are preferably stored in an external file as a library, to which the vendor preferably can add further comments. The comments are preferably captured in an indexed structure in order to be retrieved in a statistically distributed manner by a pseudorandom number generator. To avoid giving the same comment twice, every comment which is sent to the user is preferably marked as "given", and is preferably not sent to the user again during the process of negotiation.

Each comment is sent to the user through OutputScreens routine module 18 through the common gateway interface (CGI) unit or any other suitable type of Web Server Technology, such as an applet. Preferably, the comment is encoded in the form of a "virtual answer" with an attached "purchase" button. At that point, if the user chooses to purchase the product and complete the sale, the user selects the "purchase" button or otherwise indicates through the GUI that the user wishes to purchase the product. The price for the product is then the current price after the discount.

Queries to the user are sent using the function "SendAsk" 19 which outputs the query text and a field into which the user can enter an answer.

As shown in FIG. 2, a Process routine module 26 then starts operating after the query is sent, in order to receive the answer of the user. Process routine module 26 analyzes the answer using the neural networks CheckAbort and CheckAccept to determine whether the system should accept the price offer of the user, end the negotiation or continue the process. If the system accepts the offer, the product is marked as "sold" for the price given by the user, and the user is notified that the offer is accepted 34. The negotiation system is then exited and the purchase process continues with the formalities, such as transferring payment through a credit card.

If the negotiation process is stopped, a different appropriate comment is sent to the user 32. The negotiation system is then exited and the sales process also preferably stops. This decisions are made by the neural networks CheckAccept routine module 30 and CheckAbort routine module 28 respectively.

If the process of negotiation continues, Process routine module 26 reads the Remainder value from memory 10 and examines this value. If the Remainder value is greater than a predetermined constant, preferably the number 2, Process routine module 26 randomly selects a number N, in which N is greater than or equal to 1, and less than or equal to the Remainder value. The number of interactions until the next query is determined according to N. Process routine module 26 then calculates the new Remainder values and stores this value in memory 10, overwriting the previous Remainder value. The neural network in OneThresh4Price routine module 42 is invoked to overwrite the results from StartP3Price routine module 8. These neural networks set the discount amount to be given as a percentage of the original price.

After receiving the number N and calculating the new Remainder value, Process routine module 26 routine calls CollectScreens routine module 14 to collect N number of GUI output displays, or "screens", to be displayed to the user. OutputScreens routine module 18 sends these "screens" to the user, preferably through standard CGI routines (or other Web server technology).

Alternatively, if the Remainder value is smaller than the predetermined consonant, preferably 2, Process routine module 26 routine receives a reaction comment with regard to the input, lowers the price 22 according to the discount returned from the neural network of OneThresh4Price routine module 42, receives a notification comment to notify the user about the discount 24 and sends these two comments sequentially over the Internet. The remainder value is overwritten and set to 0. The value 2 is preferred for the following reasons. First, since the "Remainder" value forms the seed for the pseudorandom number generator, this value should be greater or equal to 2 in order to achieve some randomization. In addition, those cases where the discounts come frequently and the cases where the discount can take a few screens to appear should be merged equally.

The neural network contained in a SetMood routine module 44 is preferably then launched to set the system's mood according to at least the two previous price offers by the user. SetMood routine module 44 also considers the previous mood to determine if the existing mood is more or less favorable, according to the behavior of the user.

Figure 3:
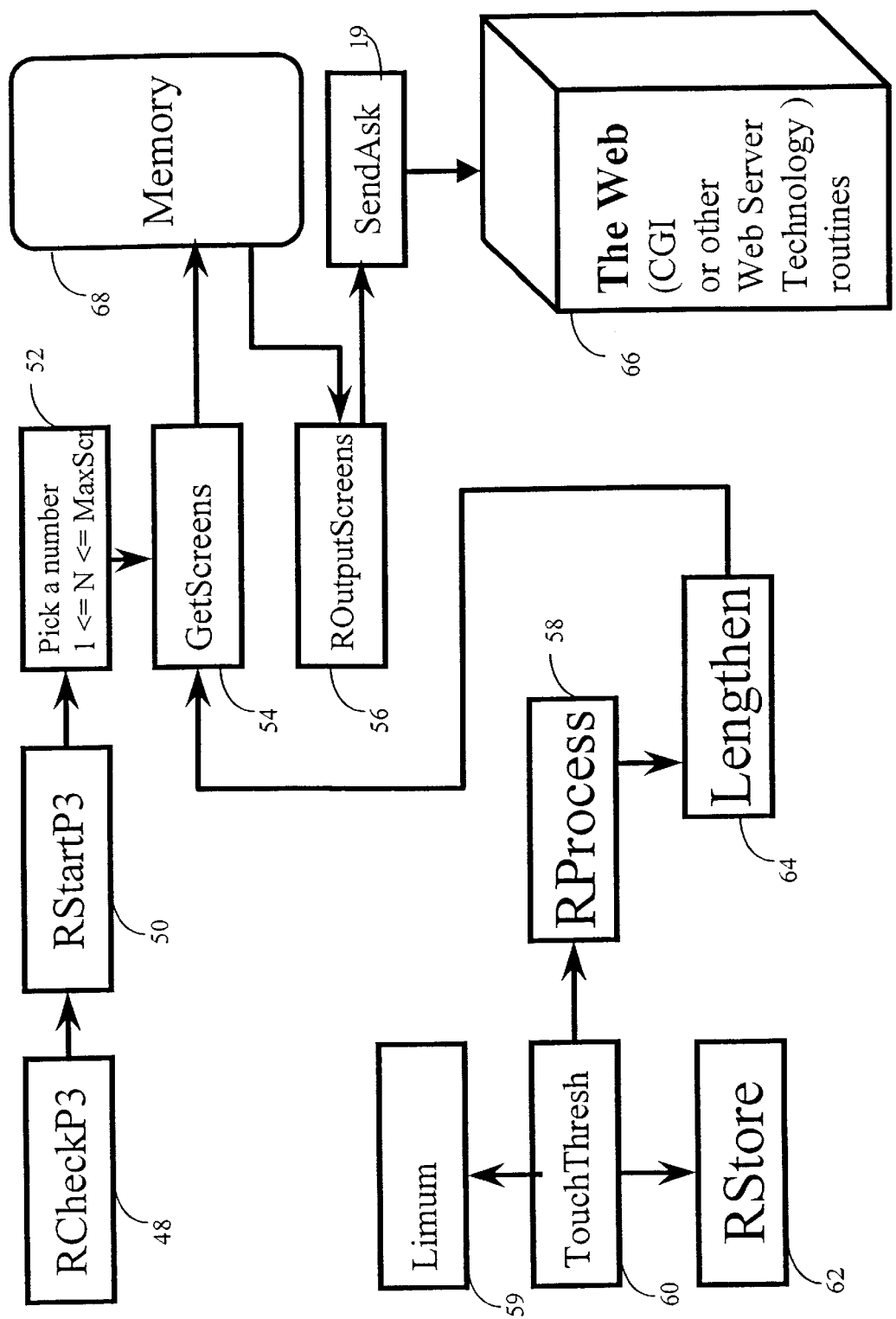
FIG. 3 is a schematic block diagram of an illustrative method of conducting the negotiation using a pseudorandom algorithm according to the present invention.
Figure 4:
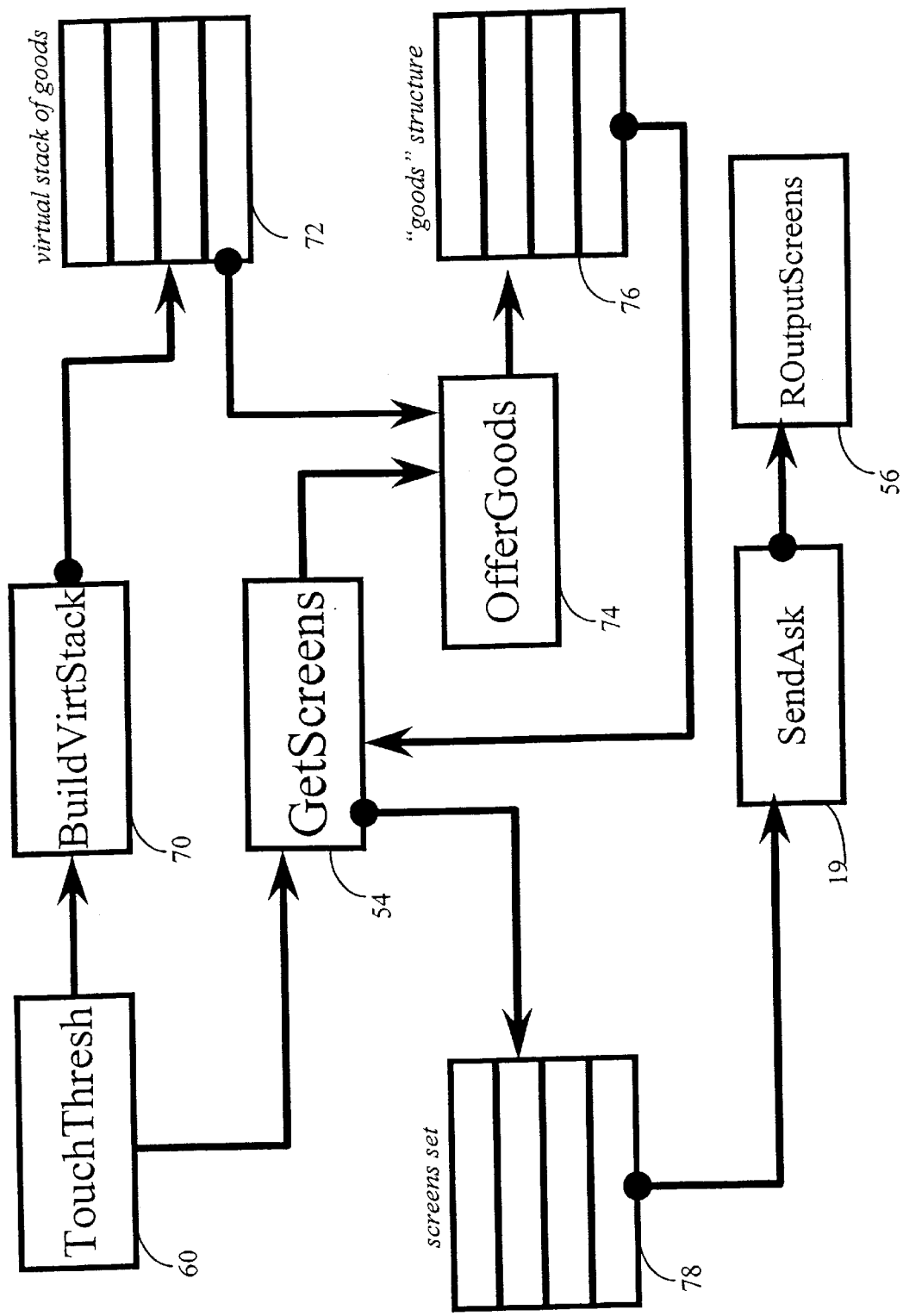
FIG. 4 is a schematic block diagram of an illustrative method of adding more parameters to the negotiation process according to the present invention.
Figure 5:
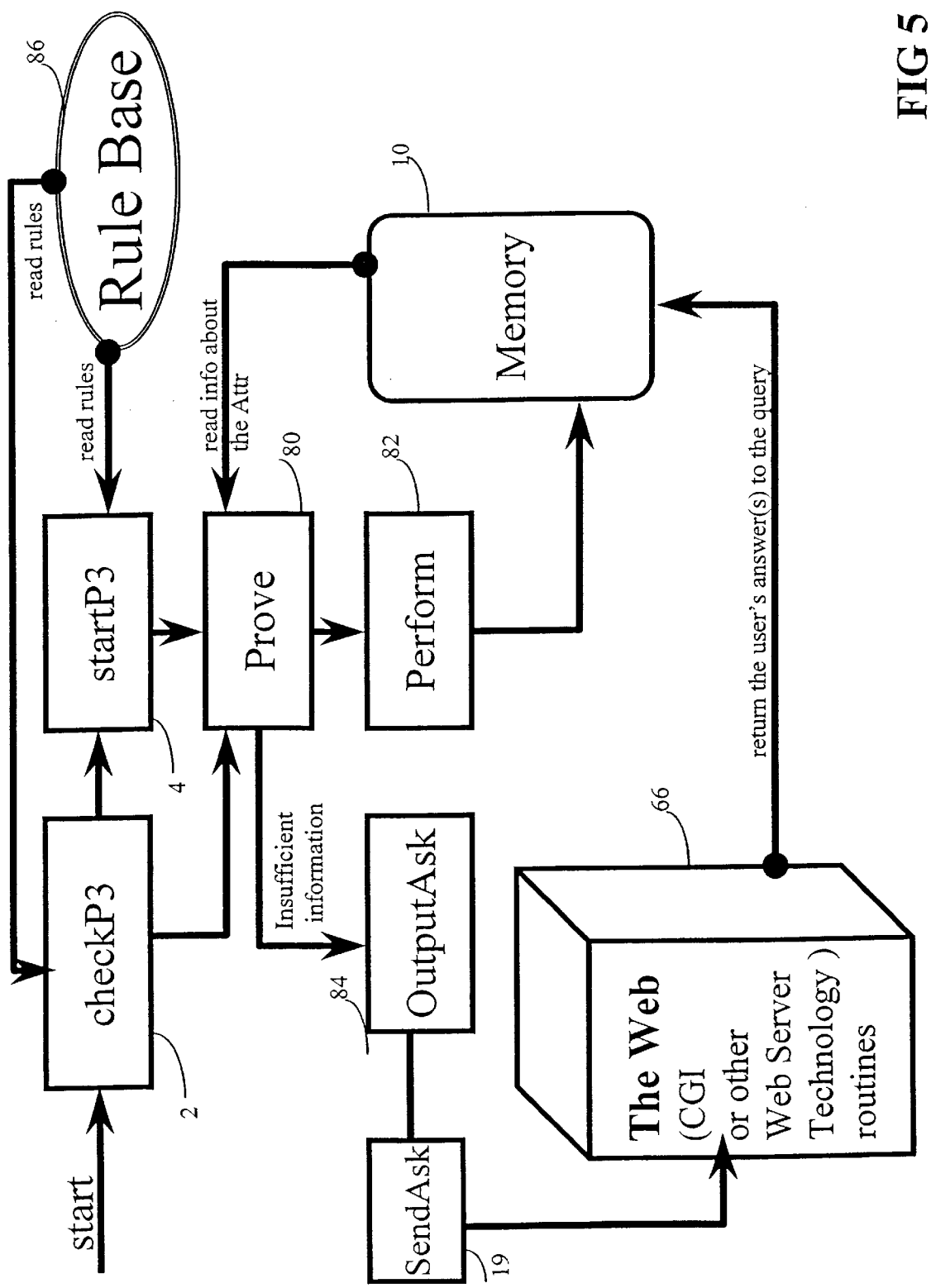
FIG. 5 is a schematic block diagram of an illustrative method for implementing the negotiation process through business rules according to the present invention.

FIG. 3 shows a schematic block diagram of an illustrative method of conducting the negotiation using a pseudorandom algorithm, rather than a neural network, according to the present invention.

The method starts with the initialization of an RCheckP3 routine module 48. As for CheckP3 routine module 2 of FIG. 1, RCheckP3 routine module 48 checks to see if all conditions to begin negotiations are fulfilled. The conditions preferably include the following. First, preferably the user has received information for purchasing one or more products. Second, preferably the product information received from the system has an associated price. Third, preferably the product has not been purchased. Fourth, preferably the vendor has determined that the price of the product is negotiable. If all those conditions are fulfilled, RCheckP3 routine module 48 activates RStartP3 routine module 50.

RStartP3 routine module 50 performs several functions. First, RStartP3 routine module 50 examines a memory 68 for any comments to be sent to the user. These comments, if any, are sent one by one to the user. Otherwise, a query from the external library is sent to prompt the user for a price offer. After the query is answered, RStartP3 routine module 50 calls RProcess routine module 58 to examine the user's input. RStartP3 routine module 50 detects if the user pressed the "Purchase" button, in which case the system for negotiating is exited and the process continues for completing the formalities of the sale. RStartP3 routine module 50 then returns the product's name and new price to the calling function.

A set of threshold intervals is generated and converted into a list of prices to be lowered. Preferably, the set of thresholds is predefined by the vendor. This set preferably includes an "unreasonable limit", below which any price offer triggers an end to the negotiation process, and various internal threshold values which represent the amount of the discount the system should give in the process of negotiations.

Next, the Limum function 59 is called to adjust the values so that each process of negotiation is unique. The limum function 59 creates the set of thresholds so that exactly same discounts are not given in different sessions. A signed real is created by a pseudorandom number generator for every threshold. A new threshold value is then created by adding the real number to the original threshold value.

Next, the pseudorandom number generator is used to select a number N different GUI output displays of the maximum number allowed, as shown in Block 52. The number, N, is passed to a GetScreens routine module 54 to collect N GUI output displays and mark them as "given" so that the displays are not sent twice. CollectScreens routine module 14 is then launched to append the "Purchase" button to the comments' test and output the GUI output displays one by one to the Internet or other electronic interface, using a CGI (or other Web server technology) routine module 66.

After these N GUI output displays have been sent, the price is lowered according to the discount. The lowered price is sent to the user as a notification comment, or else the user receives a query to submit a price offer. The decision is made randomly by a TouchThresh routine module 60. If the decision is for a notification comment, such a comment is randomly selected from the library of comments, and is sent with ROutputScreens routine module 56. Otherwise, a query comment is selected and sent.

The responses of the user are saved in one list by an RStore routine module 62 Rstore routine module 62 receives the input from the user, returned in a form of a string by the standard CGI (or other Web server technology) routine, and converts this input to a real number. Then, Rstore routine module 62 determines whether overcharging may have occurred, such that the user entered a price offer which is larger than the original price set by the vendor. If such overcharging occurs, an appropriate message is sent to the user and the input is deleted from the system. If such overcharging did not occur, the input is appended to a list which holds every input received by the user since the beginning of the negotiating process.

As previously described, such a price offer from the user could fall into one of several categories. For example, if the price offer is lower than the "unreasonable limit", the negotiation process ends immediately. If the price offer is above the "unreasonable limit" but is below the lowest allowed price (the last threshold), the user receives a reaction comment, indicating lack of acceptance of the price offer. If the price is larger than the preferred price (the first threshold), the product is sold for the price entered by the user.

Otherwise, Rprocess routine module 58 determines comments to be sent and a discount to be offered. If the input is closer to the first threshold, then preferably many more interactions should be performed to convince the user to pay the higher price. Otherwise, fewer interactions should preferably be performed in an effort to secure the sale.

Preferably, in order to determine which threshold is closer, a pseudorandom number generator generates a number N greater than or equal to 1, but less than or equal to the number of screens remaining to output. N is then divided into two portions as follows. If the user's input is closer to the first threshold, then the two portions are unequal, and the largest portion is used to determine the number of screens to output until the second threshold is reached. If the input is closer to the second threshold, then the smallest portion is used for the number of screens to output before the second threshold is reached.

If the number of allowed interactions has been performed but the user may be close to accepting an offer, then preferably this number is increased slightly to attempt to secure the sale. Such a determination is performed according to the input received from the user.

This input is preferably examined as a sequence of received price offers by Lengthen routine module 64. If the sequence reflects a series of increased offers, then the user is interested in reaching an agreement. In that case, the number of maximum interactions is increased by a predetermined constant. If the sequence reflects a series of decreased offers, such that each successive offer is lower than the preceding offer, then the user is presumably not interested in reaching an agreement. In this case, the negotiations are ended. If the user enters the same offer each time, then reaching an agreement is unlikely. In this case, only the previously determined maximum number of interactions is performed. If the user enters different numbers without any clear trend or relationship between these numbers, presumably the user is not interested in reaching an agreement and the process of negotiation is ended immediately.

According to a preferred embodiment of the present invention, business rules can also be used to regulate the first implementation of the method of the present invention with neural networks. For example, these rules could be used to determine the maximum number of screens permitted during the negotiation process. These rules could also be used to set a different bottom limit for the price based on certain criteria. The mood and whether the product is negotiable could also be determined through rules.

Each of these rules represents a special rule with a unique structure. These rules are called "Negotiation Rules" (NR) and all of them are preferably defined with special keywords. The system uses these rules to set the values determined by the rules. First, rules which control the maximum number of screens during a single negotiation session are of the form negRule(<Product's name>, if<Conditions>then setMaxSer=<Number>). Rules which control the bottom price limit for a product are of the form negRule(<Product's name>, if<Conditions>then setBotLim=<Number>). The "Number" value represents the minimum percentage of the original price for which the product may be sold.

Rules which control the initial mood of the system are constructed in a form "negRules(<Product's name>, if<Conditions>then setInitMood=<Mood>)". If the rule is found by the system for that product, the value overrides the default setting for the initial mood, such as "medium", and sets the mood given in this rule instead.

The rules which control whether the negotiation should take place at all are examined in CheckP3 routine module 2 initially. These rules are of the type negRule(<Product's name>, if<Conditions>then setP3Neg=<On/Off>). CheckP3 routine module 2 searches for these rules and if proven, either starts negotiation (if the "setP3Neg" value is "On") or does not ("setP3Neg" is set to "Off").

When started for the first time, CheckP3 routine module 2 searches for rules with the keyword setP3Neg and the current product name. If such a rule is found, CheckP3 routine module 2 calls Prove routine module 80 to prove the conditions.

Prove routine module 80 proves the conditions, which are constructed in a form of {Attr, Value} pairs, linked by one of any of the logical operators {and, or,=} (the "=" sign here states the cases when "color=Yellow", i.e.—not arithmetical equation) and the arithmetical operators of comparison {=, \=, <, >, <=, >=}. Prove routine module 80 recursively performs the following steps:

1. Prove(Part 1 and Part 2): Prove(Part 1, then) Prove (Part 2), when a rule is considered proven if the invocation of Prove routine module 80 both on Part 1 and Part 2 returns TRUE.

2. Prove(Part 1 or Part 2): Prove(Part 1), if not operative—Prove(Part 2), when a rule is considered proven if either the invocation of Prove routine module 80 on Part 1 returns TRUE or the invocation of Prove routine module 80 on Part 2 returns TRUE.

3. For any other operator—Prove(X) compares the pattern of the condition to the already known information. It returns TRUE if information is available about the Attribute (like: color, size, shape) and this information is identical to the information the condition expects (i.e.—Blue, Big, Round). Prove routine module 80 returns FALSE—if such information is not the information that the condition expects. For example, the condition states "if . . . color=Blue . . . ", but the information that provided states that color=Yellow.

If no Attribute is available, Prove routine module 80 calls outputAsk 84 to get more information from the user by sending questions through a CGI script or other Web server based technology, as previously described. The user's answers to those questions are gathered and written to memory 10 to be used in the Prove routine module 80.

If Prove routine module 80 succeeds in proving the conditions, Prove routine module 80 calls Perform routine module 82 which places the result of the rule to memory 10. CheckP3 routine module 2 examines this result. If the result states that the negotiations for the current product (setP3Neg are "Off"), CheckP3 routine module 2 does not start the negotiations.

If no rule with the keyword setP3Neg is present for the current product, or if the rule was not proven, or the setP3Neg's result is "On", CheckP3 routine module 2 routine launches StartP3 routine module 4.

Before invoking the neural networks, StartP3 routine module 4 searches the rule base 86 for rules with the keyword "setInitMood" and rules with the keyword "setBotLim". If a rule with the keyword "setInitMood" is found, StartP3 routine module 4 starts Prove routine module 80 to prove the conditions in the rule. If the conditions were proven, the Perform routine module 82 is launched to write the results of the rule to memory 10. StartP3 routine module 4 examines the results, and writes to the memory the mood given in the results, overriding the default setting or the system's mood. A similar process is performed for the "setBotLim" keyword.

StartP3 routine module 4 also searches for rules with the keyword "SetMaxScr". If these rules are found, and their conditions are proven, StartP3 routine module 4 sets a flag names "limited". This flag is referenced in the Process routine module 26, before launching the neural network of CheckAbort routine module 28. Process routine module 26 compares the number of screens given so far with the value stated in "SetMaxScr" to determine if the maximum number of screens have been sent.

According to another preferred embodiment of the present invention, various presents and benefits may be offered instead of a price discount during the negotiation process. This preferred feature may be implemented either with the neural network embodiment of the present invention, or alternatively with the pseudorandom embodiment of the present invention.

The presents and benefits to be offered may optionally include, but are not limited to, an additional product for no extra charge, a "club card", a discount on the shipping charges or a plurality of separate payments rather than a single charge for the cost of the product. These presents and benefits can be given in place of, or in addition to, the price discount.

Preferably, there is a set of all discounts, presents and benefits for the current product defined in the database, which is "the stock of goods". The stock of goods is implemented as a list, in which preferably the records take one of the following formats:

"present(<AnotherProduct>, <Another Product's price>, <Bottom limit until which the present is relevant>)" which states that if the user buys the product for the price that is bigger or equal to the bottom limit until which the present is relevant, the present "AnotherProduct" is received for the price of "Another Product's price".

Another record states "payments(<Number of payments>, <Bottom limit until which this number is relevant>)", according to which the user may purchase the product in the number of payments given if the price is greater than or equal to the "Bottom limit until which this number is relevant".

The record "shippingDisc(<Number of percents>, >Bottom limit until which this number is relevant>)" states that if the user buys the product for a price that is greater than or equal to the bottom limit, a "Number of percents" discount on the shipping is given.

These stock of goods can be awarded as follows. First the system builds a "virtual stack of goods" 72 for each threshold. For every threshold that is being touched by "TouchThresh" 60, a BuildVirtStack routine module 70 scans each of the records in the stock of goods and looks at the "Bottom limit". If the current threshold is bigger or equal to the "Bottom limit ", the current record is appended to the "virtual stack of goods" 72. BuildVirtStack routine module 70 exits only after all the records in the real "stack of goods" are scanned. No output is produced by this routine, instead "virtual stack of goods" 72 is stored in the virtual memory.

A GetScreens routine module 54 then searches memory 10 for the "virtual stack of goods" 72. If such is present in the memory, GetScreens routine module 54 calls the OfferGoods routine module 74 to invoke the pseudorandom numbers generator to return the amount of goods to be offered to the user between the current threshold and the next. The seed of the pseudorandom number generator is set to N, according to the number of screens. The result returned by the pseudorandom number generator at this point shall be referenced henceforth as N1.

The following steps are repeated N1 times. The type of goods to offer is chosen through a pseudorandom number. An appropriate comment text from the comments library is selected, to notify the user about the present or benefit. The pseudorandom number generator is invoked again to determine the location of this screen in the order of screens by a screens set routine module 78. The seed passed to the random numbers generator is N. For example, if the random number generator returns "2", the screen will be the second screen in the set of N screens which GetScreens routine module 54 should construct. The screens and then output using ROutputScreens routine module 56.

According to another option, the system optionally suggests a product which should be more compatible with the user's price limitations during the process of negotiation. If this product is bought by the user immediately, then the negotiation process ends and the formalities of completing the sale are performed. If the new product is not purchased by the user immediately and if the new product is negotiable, then the negotiation process continues with the new product. Optionally and the preferably, the new product may be offered with an immediate discount. Alternatively, if the new product is not negotiable, the negotiation process is ended.

According to still another optional but preferred embodiment of the present invention, e-mail (electronic mail) messages are sent to financial or technical institutions interested in data about sales (financial) or system behavior (technical).

For example, the vendor may decide to receive a commission every time the system of the present invention sells a product, or to give a commission to the person who designated the system if rules enhancement is used. Sales can also be tracked. Malfunctions can also be described as they happen in real time, for example, if the Neural Network gave too much of a price discount, or if the system crashed for some reason.

To send the e-mail, first the data is prepared for being sent and is saved to an external file. For a successful negotiation, the file may contain information about the product that was sold, such as the product's name, code, prices before and after negotiation, and so forth.

In the case of a malfunction, the file may contain log information about the inner process and the dump of the application's virtual memory. This data is preferably used by technical support personnel of the company and/or the program's vendor in order to locate the malfunction.

After the data files are prepared, the program launches an external e-mail client with the file(s) name(s) as parameters in command line. The e-mail client uses a Simple Mail Transfer Protocol (RFC 821) to send the files as attachments to the technical or financial institution. Any SMTP utility may be used as e-mail client, as for example 'WindMail' created by Geocel International™ for Windows™ or the popular UNIX utility 'SendMail'.

According to preferred embodiments of the present invention, natural language capabilities are provided to the user through the GUI, in order to mimic as much as possible the experience of communicating and negotiating with a human being.

Figure 6:
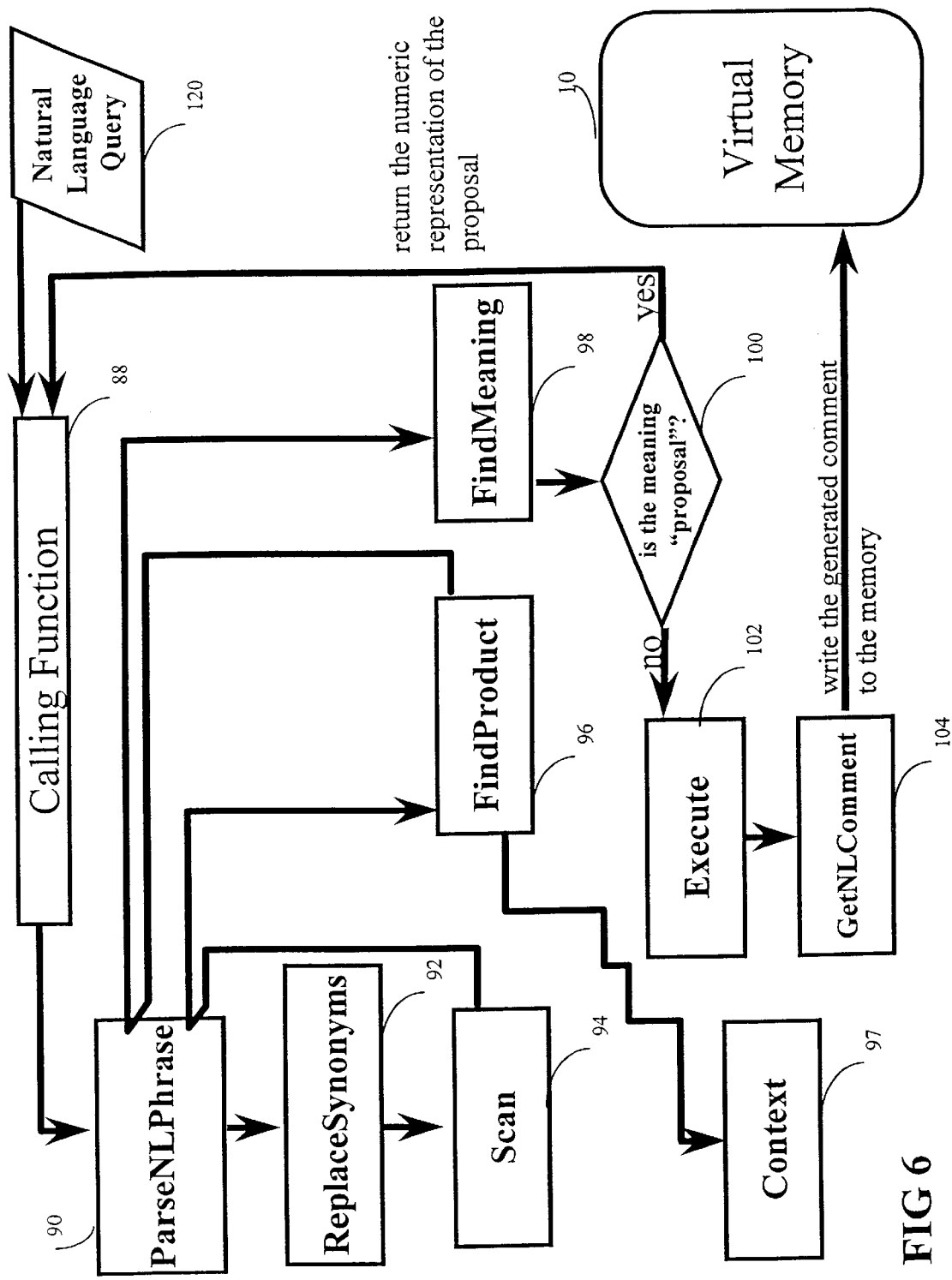
FIG. 6 is a schematic block diagram of an illustrative method for communicating with the user through natural language parsing according to the present invention.
Figure 7:
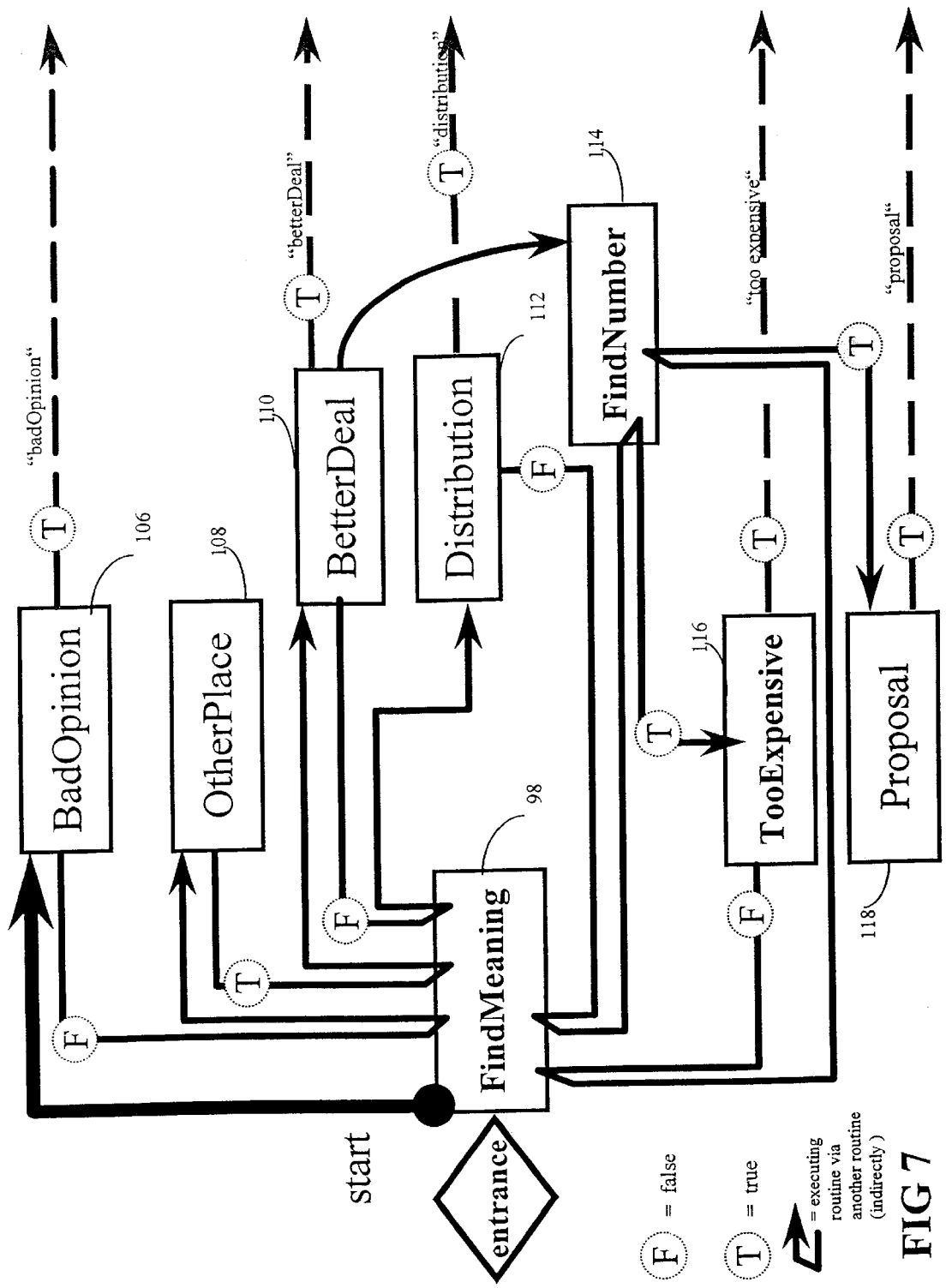
FIG. 7 is a schematic block diagram of an illustrative method for processing user input according to the natural language parsing method of the present invention.

Referring now to FIGS. 6 and 7, the natural language capabilities of the present invention start by parsing the input of the user, in the form of a natural language phrase or a word. Preferably, the price offer is received from the user as a natural language query which includes at least one word. This query is then parsed into at least one word, which is used to determine the amount of the price offer from the user. This price offer is then compared to the starting price offer from the system of the present invention, as previously described. Preferably, the amount of the price offer is determined by determining a definition of at least one word of the query according to a relationship between this at least one word and another portion of the query, and by then using this definition to determine the amount of the price offer.

More preferably, words in the query can be implied from the context of other words in the query, such that missing words from the user can be supplied in order to understand the query. Such implied words can also preferably be understood from previous comments made by the system of the present invention.

Also more preferably, if a user has already negotiated with the system of the present invention previously, information is stored about the user, including identifying information, such that if the user negotiates with the system again, this information about the user is used to adjust the negotiation process.

According to preferred embodiment of the present invention, the system of the present invention with natural language queries operates as follows. First, a ReplaceSynonyms routine 92 is launched, to find portions within the input information which can be replaced with a synonym. For example, the word "item" is preferably replaced with the word "product" and so forth. This is done in order to parse the phrase, since the parsing mechanism operates on a list of separate, disconnected words, such that the association between words is lost.

After synonyms are replaced, the phrase is converted to a list of words by a scan routine 94, which preferably ignores punctuation and optionally any pre-defined words which are to be ignored during the conversion process, preferably including pronouns such as "I", "you", and "me".

Next, a FindProduct routine 96 attempts to find a reference to the product whose price is being negotiated within the input of the user, by scanning the list of words which is received as an input argument. FindProduct routine 96 then examines each word in order to determine if such a word is the name of the product, a synonym for the name of the product or the word "product". If found, such a word in the list of words is replaced with the keyword "PRODUCT", and FindProduct routine 96 returns the new list. If such a word is not found, FindProduct routine 96 returns the original list.

If FindProduct routine 96 cannot find such a keyword as the subject in the phrase which is input by the user, the phrase may relate to a comment sent by the system recently. A context routine 97 is then able to determine the subject of the phrase from previously exchanged comments, by first identifying keyword(s) in the phrase which may suggest a reference to a previous comment. Such keywords may include, but are not limited to, the words "it", "so" and so forth, hereinafter collectively termed "the referrer".

Next, context routine 97 identifies the corresponding word or words of a previous comment by the system of the present invention which the referrer is connected, hereinafter collectively termed "the referenced part". Such identification is preferably performed by examining structures of the following forms. The first form is "that"+<Rest of sentence>vs. Abstract Verb+"it". An abstract verb is preferably a verb such as "feel", "believe", "see", and "understand", for example. The referenced part is thus, the "<Rest of sentence>".

The second form is that of a possessive verb with no continuation. Possessive verbs are verbs of the type "have", "find", "gel" and the like. In this case the referenced part is the name of the product itself.

The third form is that of a quantitative word with no continuation. Such a quantitative word is optionally "more", "less", and "lower", for example. The referenced part should be the price which was stated in the previous (referenced) phrase.

The fourth form is "Yes/No" statements, which includes words such as "yes", "no", "not really", "maybe" and so forth. In this case, the Yes/No statement should be converted to a sentence based on the response of the user. The referenced part is thus to be the entire previous sentence.

Once context routine 97 has determined the referenced part and the referrer, preferably the referrer is replaced with the referenced part. The complete sentence is now returned to a ParseNLPhrase routine 90 to complete the parsing by again dividing the sentence into the constituent words.

Next a FindMeaning routine 98 identifies the "meaning" of the sentence input by the user, which is the intention of the user when communicating with the system. Optionally and preferably, five different sentence meanings are recognized by the system. The first such meaning is a bad opinion of the negotiated product. The next meaning is the distribution of the product, or other locations where the product can be obtained. The third meaning is that a better offer for the same product can be obtained from a different vendor and/or vending location. The fourth meaning is that the product is too expensive. The fifth meaning is that the user is attempting to input a price offer for the product.

FindMeaning routine 98 first attempts to determine whether the phrase from the user includes a bad opinion of the product under negotiation, by examining the input list from FindProduct routine 96. For example, sentences input by the user, such as "This lamp is of a low quality" or "This computer is not very good" for example, now have the form "PRODUCT of a low quality" and "PRODUCT not great", since words such as "am", "is" and "are" are preferably ignored when parsing the sentence.

As shown in FIG. 7, a BadOpinion routine 106 scans the list of words to see whether the meaning of the phrase input by the user is a bad opinion of the product. BadOpinion routine 106 preferably has both a list of positive words and negative words. For example, the positive words preferably include "positive" adjectives, including but not limited to, "beautiful", "well", "positive", and "good"; "positive" verbs, including but not limited to, "able", and "working"; and "positive" nouns including but not limited to, "ability", "fitness", "joy", and "happiness". For example, the negative words preferably include "negative" adjectives including but not limited to, "ugly", "stupid", "bad", and "wrong"; "negative" nouns including but not limited to, "pain", "misery", and "misinformed"; and "negative" verbs including but not limited to, "misbehaved", "failed", and "breaks".

BadOpinion routine 106 preferably also has access to a dictionary of time expressions, sorted by "long" and "short". For example, "short" time expressions include but are not limited to "often", "frequently", "every minute", and "every day". By contrast, "long" time expressions include but are not limited to "long", "infrequently" and "seldom".

BadOpinion routine 106 then preferably identifies a bad opinion through one of the following structures. The first such structure is "PRODUCT"+"negative" verb+"positive" adjective/adverb, indicating that the product has significant ability in the performance of the negative action of the verb (for example, "This product breaks easily"). The next such structure is "PRODUCT"+"negative" verb+"short" time expression, indicating that the negative action is performed by the product either quickly and/or frequently. The third such structure is "PRODUCT"+"positive" verb+"negative" adjective/adverb, indicating that the product performs the desired action of the positive verb in a poor or negative manner. The fourth such structure is "PRODUCT"+ negation+"positive"verb, which is similar to the third structure, in that the desirable action of the positive verb is not performed by the product. The fifth such structure is "PRODUCT"+negation+"positive" verb+"positive" adjective/adverb, which is similar to the fourth structure. The fifth structure is "PRODUCT"+negation+"positive" adjective, indicating that the product lacks some desirable quality indicated by the positive adjective/adverb. The sixth structure is "PRODUCT"+negation+"positive" adjective/ adverb+"long" time expression, indicating that the product will not have the desired positive characteristic indicated by the positive adjective/adverb for a long period of time.

If a bad opinion is identified in the phrase input by the user, BadOpinion routine 106 then returns "TRUE". FindMeaning routine 98 exits, returning the flag of "BadOpinion" to the calling function. Alternatively, if BadOpinion routine 106 returns "FALSE", FindMeaning routine 98 attempts to find either a meaning of "distribution of the product" or a meaning of "a better offer for the product is available from a different vendor" in the phrase input by the user. FindMeaning routine 98 first calls an OtherPlace routine 108 to find a reference to another portion of the phrase.

OtherPlace routine 108 can identify a reference to another portion of the phrase which is input by the user, preferably according to one of a number of different structures. The first structure is preferably of the form "at"+unidentified word as may appear in the form "at <StoreName> . . . ". Another structure includes words such as "place";"shop", "store", "mall";"site", for example. Yet another structure includes verbs which indicate transition or presence, such as "been", "gone", and "traveled",+the word "to"+an unidentified word, such as "I traveled to China" for example. Other important words are words which indicate location, such as "everywhere", "every place","all over", "elsewhere" and so forth.

If OtherPlace routine 108 finds a reference to location. OtherPlace routine 108 returns "TRUE" and the word(s) which are suspected to be the name of the location OtherPlace routine 108 then replaces these words in the list with the keyword "LOCATION" and returns the new list. If a reference to a location is not found, then OtherPlace routine 108 returns FALSE.

If OtherPlace routine 108 does return TRUE, then FindMeaning routine 98 proceeds so match the meaning of the phrase with either "distribution of the product at different locations" or "a better offer for the product is available from a different vendor". A BetterDeal routine 110 is the first routine to be launched if either of these two meanings ie true. BetterDeal routine 110 receives the list of words returned by OtherPlace routine 108, so all the sentences of the form "<NameOfStore> offered me PRODUCT for 500 dollars" for example, are now of the form, "LOCATION offered me PRODUCT for 500 dollars".

BetterDeal routine 110 is used to determine whether the user had received a better offer for the product from a different vendor, so first BetterDeal routine 110 attempts to find s statement of price by calling a FindNumber routine 114. FindNumber routine 114 searches for a price in one of the following structures of the words of the phrase input by the user. The first structure is number+currency such as "50 dollars" for example. The second structure is the textual representation of a number+optional "numeric" noun+a currency symbol, such as "five K $", in which "K" indicates a thousand, such that the number is "five thousand dollars". The third structure includes the word "for"+number, such as "for 50". The fourth structure includes the word "for"+ textual representation of a number, such as "for six hundred".

If a successful match is found, FindNumber routine 114 replaces the words representing a number with the keyword "NUMBER", remove the currency symbol if found, and returns the new list with the generated number.

If a statement of a price offer for the product by the user cannot be found by any of the above listed methods, FindNumber routine 114 returns FALSE and BetterDeal routine 110 invokes other structures, in an attempt to find general words which indicate a better offer which has been obtained from a different vendor. For example, such a structure could be "LOCATION"+"PRODUCT"+for+one of the phrases selected from the group consisting of "less", "smaller price", "lower price", "better deal", "better price", bid", and so forth.

If such a structure is found in the sentence, then Better-Deal routine 110 returns TRUE. FindMeaning routine 98 exits, returning the flag "BetterDeal" and the name of the location returned by OtherPlace routine 108 to the calling function.

If BetterDeal routine 110 failed to generate a meaning of "a better price is available from a different vendor", Better-Deal routine 110 returns "FALSE" and FindMeaning routine 98 attempts to find a meaning of "distribution of the product of another vendor/location" by calling a Distribution routine 112. Distribution routine 112 verifies that the meaning is indeed "distribution", knowing that a reference to a location is found in the original phrase, but no price is mentioned. Distribution routine 112 then preferably searches for the following structures is the phrase from the user. One such structure is preferably FindWord—"PRODUCT"+ "LOCATION". FindWord is a word selected from the group consisting of "see", "find", "discover" and the like. The second structure is "LOCATION"+possession+ "PRODUCT", indicating that the product is available at a different location.

If the meaning of "distribution" is verified, such that one of these structures is found, then Distribution routine 112 returns "TRUE". FindMeaning routine 98 then exits, returning the flag "distribution" and the name of the location returned by OtherPlace routine 108 to the calling function. Otherwise, OtherPlace routine 108 returns FALSE.

If OtherPlace routine 108 returns FALSE either now or previously, FindMeaning routine 98 then attempts to match the meaning of the sentence with "too expensive". For this purpose, FindMeaning routine 98 operates a TooExpensive routine 116. However, before launching this routine, Find-Meaning routine 98 launches FindNumber routine 114 again, to find a reference to the price," if such exists. The input of TooExpensive routine 116 is the output list generated by FindNumber routine 114.

Since TooExpensive routine 116 receives a list of words previously processed also by FindProduct routine 96, so the list preferably contains the keywords "PRODUCT" and "NUMBER", thereby enabling identification of the following structures. The first structure is PRODUCT+negation+ NUMBER, indicating that the PRODUCT is not worth the NUMBER of currency units requested. The second structure is NUMBER+"too" or "very"+a phrase which means "expensive", thereby indicating that the price is too high. The third structure is Negation+word that states payment+ NUMBER, indicating that the user refuses to pay NUMBER of currency units for the product. The fourth structure is simpler, and is "Negative" verb–NUMBER, again refusing to pay for the product at the NUMBER price. The fifth structure is negation+"positive" verb+NUMBER.

If TooExpensive routine 116 finds any of these structures, TooExpensive routine 116 returns TRUE. FindMeaning routine 98 then exits and return the flag "tooExpensive" to the calling structure.

If TooExpensive routine 116 returns FALSE, then Find-Meaning routine 98 attempts to derive a price proposal from the phrase by passing the information to a Proposal routine 118. Proposal routine 118 then searches for the following structures. The first structure is PRODUCT+NUMBER, indicating an exact price offer by the user. The second structure indicates an offer of future payment by the user for a particular NUMBER by future payment verb+NUMBER. If such a price offer is found. Proposal routine 118 returns TRUE and FindMeaning routine 98 exits with the flag "proposal" to the calling function.

An Execute routine 102 then receives the flag returned by FindMeaning routine 98 along with a name of location returned by OtherPlace routine 108 if such a location exists, and a number returned by FindNumber routine 114, if such a number exists. Execute routine 102 then constants an appropriate response for the system to give to the user, according to the various flags received.

For example, if the badOpinion flag is set, then the system constructs either a negation comment of a recommendation continent, in an attempt to overcome the bad opinion of the user and rum the bad opinion into a positive opinion of the product. The selection decision is optionally and preferably made randomly, such that one comment is preferably chosen and returned to the calling function. Optionally and preferably, a "GetKeyFeatures" routine is launched (not shown) to try to find the "key features" of the product. "Key features" are a few sentences describing the product's advantages. These sentences are supplied by the vendor and may reside in a text file, a spread sheet or a database. Once retrieved by "GetKeyFeatures", these sentences would be used to generate a reply to the user's comment, suggesting a bad opinion about the negotiated product.

If the vendor did not supply information about the key features of the current product, "GetKeyFeatures" preferably obtains "standard" key features from a library. These "standard" key features are preferably in the form of a template sentence, with a space for the name of the product. This template preferably has one of several structures. For example the structures could be selected from the group consisting of "Intro Phrase"+"Key Feature"+"Closing Phrase"; "Intro Phrase"+"Key Feature"+"price Comment"; "Key Feature1"+"Key Feature2"+"Closing Phrase"; and "Price Comment"+"Key Feature".

Once a template structure is selected, the "cells" of the template, such as "Intro Phrase","Key Feature" and the like an filled. This is done by a call to the "FillTemplate" routine (not shown) which receives the selected template structure, the key features, and a pointer to a library with comments supplied by the vendor. The "Key Feature" cell is replaced by the key feature of the product which is sent to "FillTemplate". "Intro Phrase" is a short introductory opening phrase, while the "Closing Phrase" closes the sentence. "Price comment" is a phrase which comments on the price of the product.

If the betterDeal flag is set, then either generic comments an submitted, preferably from a vendor-supplied library of such comments, of else predefined comments from the vendor are sent to the user. Preferably, such a comment is stored in a special library and is determined according to the policy of the vendor. Otherwise; a generic comment might be selected from a library, attempting to generally promote the purchase of the product from the currant vendor, for example by emphasizing the excellent service offered by this current vendor.

If the distribution flag is set, then a special type of comment defined for this specific purpose is preferably sent, in an attempt to show that the particular product offered by the present vendor is very good and special, as opposed to commonly available products of this type. If the tooExpensive flag is set, then a special type of comment defined for this specific purpose is also preferably sort, in an attempt to overcome the negative opinion of the price of the product. If the Price offer derived from sentence flag is set, then preferably the push3 flag is set and the main routine module, a StartP3 routine module 4, is started by the system. The number is then processed by the appropriate routines as described above.

All comments are gathered by GetNLComment routine 104. GetNLComment routine 104 selects the appropriate comment, preferably using s pseudo-random number generator, and writes the comment to memory 10. CollectScreens routine module 14 than obtains this comment from memory 10 and appends the comment to the screens for returning to the user.

OutputScreens routine 18 attaches a text field to each comment which is output from memory 14, for the purpose of allowing the user to write sentences and queries in a natural language. If the text field is not empty, as determined by StartP3 routine module 4 (FIG. 1), then StartP3 routine module 4 launches ParseNLPhrase routine 90. If ParseNLPhrase routine 90 returns a number, then StartP3 routine module 4 launches Process routine module 26 (FIG. 2) to process the number. Otherwise, StartP3 routine module 4 determines if comments were written to memory 10. StartP3 routine module 4 the launches OutputScreens routine 18 to output these comments. Otherwise, StartP3 routine module 4 launches "SmartReply" to answer the user's phrase. A similar implementation for the random number determination, the neural network determination and the rules-based determination of the reply comments are all optionally implemented according to this description.

The SmartReply routines are invoked if no prepared comments reside in memory 10 for CollectScreens routine module 11 to output, and attempt to generate a reply based on a keywords that can be found in the user's phrase. Preferably, each word of the user's original sentence is examined to see whether true word matches a certain keyword group. Groups are sets of words, in the form "group (GroupName, ItemName)" which reside in an external file or library. ItemName may be a noun as well as a verb. For example 'group("flying animals", "bird")' states that the word 'bird' belongs to a group named 'flying-animals'.

The "SmallReply" routine attempts to thatch at least one word from the phrase of the user with at least one of the groups. If it finds such a match, the routine then tries to find a response to this group, by referring to another structure at the same library which is called "response_on_group".

"Response_on_group" preferably has the following structure: 'Response_on_group("GroupName", "ResponseText")'. For example 'Response_On_Group ("automobiles", "I really don't have a lot of information about automobiles")', states that whenever the user mentions a type of automobile in the phrase, the system will send this reply.

Preferably, the library bas multiple responses in each group, from which one reply is selected randomly and sent to the user. Alternatively and preferably, a reply can be produced from combinations of the various groups, thereby more carefully simulating natural human language.

According to other optional and preferred embodiments of the present invention, the system of the present invention is able to remember previous users, including the negotiating style of these users, in order to be able to negotiate with a previous user in a similar manner as before. This is preferably implemented by saving a cookie in the Web browser of the user, containing data about the user such as, for example, the mood of the system while talking with the user.

According to this preferred embodiment, the next time which the user interacts with the system, preferably the mood of the system is taken from the cookie by the "GetMood" routine. The mood taken from the cookie initializes the mood variable in the current session rather than setting the initial mood to the default value. This affects all further decisions made by the "SetMood" routine (see FIG. 2).

According to other optional but preferred embodiments of the present invention, the system is able to express the mood of the negotiations to the user in a graphic manner. For example, the color and style of the page background, the size of the picture of the negotiated product and the size of an optional picture and/or video of the salesman, could all be adjusted according to the mood of the negotiations. As a specific, illustrative example of the connection between the mood of the system and the graphic display to the user, the picture and/or video of the salesman could optionally be of a happy, smiling salesman if the mood is determined by the system to be good and positive, as previously described, but frowning or unhappy otherwise.

It will be appreciated that the above descriptions are intended only to serve as examples, and that many other embodiments are possible within the spirit and the scope of the present invention.

What is claimed is:

1. A method for an automatic negotiation process between a vendor's computer and any user through an electronic interface for a product having a starting price, the steps of the method being performed by the computer, the method comprising the steps of:

(a) receiving a natural language query from a user, the query not having been restricted as to the choice of words;

(b) attempting to extract an identifiable meaning from said query and to classify said meaning into one of a group of classes including—(i) a refusal to purchase the product, (ii) a price offer for the product and (iii) an agreement to purchase the product at the suggested price and (iv) an opinion about the product;

(c) if a meaning has been extracted from said query and classified as a price offer, weighing said price offer against the starting price and against stored negotiation parameters by means of a negotiation comparator;

(d) if said negotiation comparator is fulfilled by said price offer, accepting said price offer; and (e) alternatively, if said negotiation comparator is not fulfilled by said price offer, offering a discount incentive to the user, determined by a discount incentive comparator.

2. The method of claim 1, wherein said negotiation comparator is a neural network.

3. The method of claim 1, wherein said negotiation comparator includes a pseudorandom generator, such that said price offer fulfills said negotiation comparator according to an output of said pseudorandom generator.

4. The method of claim 1, wherein said negotiation comparator includes a plurality of rules, such that said price offer fulfills said negotiation comparator according to said plurality of roles.

5. The method of claim 1, wherein said discount incentive is selected from the group consisting at least of (i) a price discount on the starting price of the product, (ii) a present, (iii) a discount in a cost of shipping the product (iv) an increase of the number of payments for the product and (v) a benefit.

6. The method of claim 1, wherein said discount incentive comparator is a plurality of rules, such that if the price offer fulfills at least one rule, said discount incentive comparator is fulfilled.

7. The method of claim 1, wherein steps (a), (b), (c) are repeated for a number of repetitions and wherein said number of repetitions fulfills said discount incentive comparator if said number of repetitions is lower than a predetermined maximum number of repetitions for the automatic negotiation process, and is greater than a waiting number of repetitions for waiting until said discount incentive is offered to the user.

8. The method of claim 1, wherein steps (a), (b), (c), (d) and (e) are repeated during each interaction with the user until an ending condition occurs.

9. The method of claim 1, further comprising the steps of:
(f) If the user is new to the vendor, assigning him an identifier;
(g) storing a record of the automatic negotiation process with the user, in association with his identifier;
(h) when a user starts an additional negotiation session, obtaining his identifier and the record stored in association therewith and adjusting the automatic negotiation process according to said record.

10. The method of claim 1, wherein step (e) further comprises the step of sending a promotional comment to the user, justifying the starting price.

11. A program storage device readable by machine, tangibly embodying a program of instructions executable by the machine to perform method steps for an automatic negotiation process between a vendor's computer and any user through an electronic interface for a product having a starting price, the method comprising the steps of:
(a) receiving a natural language query from a user, the query not having been restricted as to the choice of words;
(b) attempting to extract an identifiable meaning from said query and to classify said meaning into one of a group of classes including—(i) a refusal to purchase the product, (ii) a price offer for the product and (iii) an agreement to purchase the product at the suggested price and (iv) an opinion about the product;
(c) if a meaning has been extracted from said query and classified as a price offer, weighing said price offer against the starting price and against stored negotiation parameters by means of a negotiation comparator;
(d) if said negotiation comparator is fulfilled by said price offer, accepting said price offer; and
(e) alternatively, if said negotiation comparator is not fulfilled by said price offer, offering a discount incentive to the user, determined by a discount incentive comparator.

\* \* \* \* \*